United States Patent
Ekambaram et al.

(10) Patent No.: US 10,095,608 B2
(45) Date of Patent: Oct. 9, 2018

(54) APPLICATION TEST AUTOMATION TRANSMITTING DATA VIA PHONE/VOICE CALLS

(71) Applicant: International Business Machines Corporation, Armonk, NY (US)

(72) Inventors: Vijay Ekambaram, Tamilnadu (IN); Ashish K. Mathur, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/854,391

(22) Filed: Sep. 15, 2015

(65) Prior Publication Data
US 2017/0075797 A1    Mar. 16, 2017

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC .......................... G06F 11/3684; G06F 11/3692
USPC .... 714/38.14, 39, 38.1, 38.11, 38.12, 38.13; 717/124, 125, 126
See application file for complete search history.

(56) References Cited

U.S. PATENT DOCUMENTS

| | | | |
|---|---|---|---|
| 7,562,019 B2 | 7/2009 | Cohen et al. | |
| 8,452,291 B2* | 5/2013 | Gao | H04M 3/4234 370/216 |
| 8,661,254 B1* | 2/2014 | Sama | H04L 9/3215 380/247 |
| 2007/0208942 A1* | 9/2007 | May | H04L 63/0428 713/171 |
| 2007/0234293 A1* | 10/2007 | Noller | G06F 11/3688 717/124 |
| 2008/0147821 A1* | 6/2008 | Dietrich | G06F 17/30206 709/216 |
| 2011/0320879 A1 | 12/2011 | Singh et al. | |
| 2012/0198279 A1 | 8/2012 | Schroeder | |
| 2013/0078983 A1 | 3/2013 | Doshi et al. | |
| 2014/0222676 A1 | 8/2014 | Lee et al. | |
| 2014/0250512 A1 | 9/2014 | Goldstone et al. | |
| 2014/0277493 A1 | 9/2014 | Glad et al. | |
| 2015/0100832 A1* | 4/2015 | Nanjundappa | G06F 11/3688 714/38.14 |

OTHER PUBLICATIONS

Gomez et al.; "RERAN: Timing- and Touch-Sensitive Record and Replay for Android", IEEE; © 2013, IEEE;ICSE 2013, San Francisco, CA, USA; pp. 72-81.

Song et al.; "An Integrated Test Automation Framework for Testing on Heterogeneous Mobile Platforms"; IEEE; 2011 First ACIS International Symposium on Software and Network Engineering; © 2011, IEEE; pp. 141-145.

(Continued)

*Primary Examiner* — Dieu-Minh Le
(74) *Attorney, Agent, or Firm* — Alexander G. Jochym

(57) ABSTRACT

An application for testing is determined. A test script associated with the application for testing is determined. The application is tested using the test script. The testing requires transferring data form the application to an out-of-band channel.

18 Claims, 3 Drawing Sheets

(56) References Cited

OTHER PUBLICATIONS

"About Instruments"; Apple; Copyright @ 2014 Apple Inc; Updated: Oct. 20, 2014; Printed on: May 4, 2015; pp. 1-2; <https://developer.apple.com/library/mac/documentation/DeveloperTools/Conceptual/InstrumentsUserGuide/Introduction/Introduction.html>.

"Automated Mobile Application Testing", Jamo Solutions; 2013, NV; Printed on: May 4, 2015; pp. 1-6; <http://www.jamosolutions.com/>.

"Mobile App Testing Tool"; MonkeyTalk; Copyright © 2015. CloudMonkey LLC; pp. 1-3; <https://www.cloudmonkeymobile.com/monkeytalk>.

"Mobile Testing and Monitoring Tools—SeeTest of Experitest"; Experitest; Printed on: May 4, 2015; Experitest Ltd, 2015; pp. 1-4; <http://experitest.com/>.

"Rational Test Workbench"; IBM; Printed on: May 4, 2015; pp. 1-2; <http://www-03.ibm.com/software/products/en/rtw>.

"Software Testing Tools, Automted Testing Software"; Telerik; Printed on: May 4, 2015; Copyright © 2002-2015, Telerik; pp. 1-2; <http://www.telerik.com/teststudio>.

"Squish GUI Tester"; Froglogic; Printed on: May 4, 2015; Copyright © 2015 froglogic GmbH; pp. 1-2; <http://www.froglogic.com/squish/gui-testing/>.

"Testing Fundamentals"; Android Developer; Printed on: May 4, 2015; pp. 1-2; <http://developer.android.com/tools/testing/testing_android.html>.

\* cited by examiner

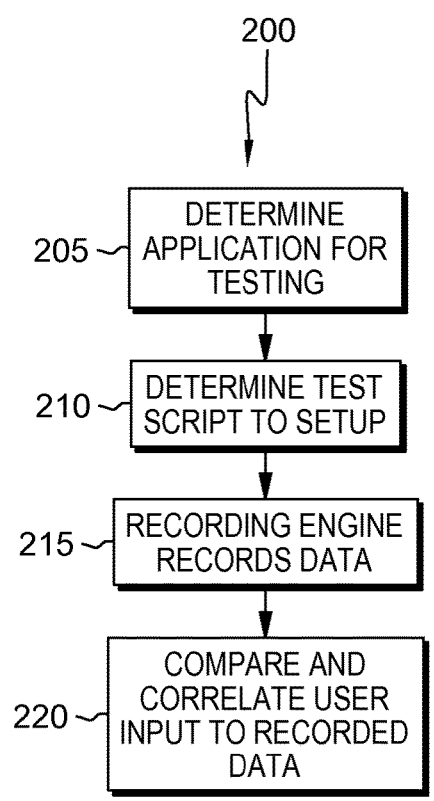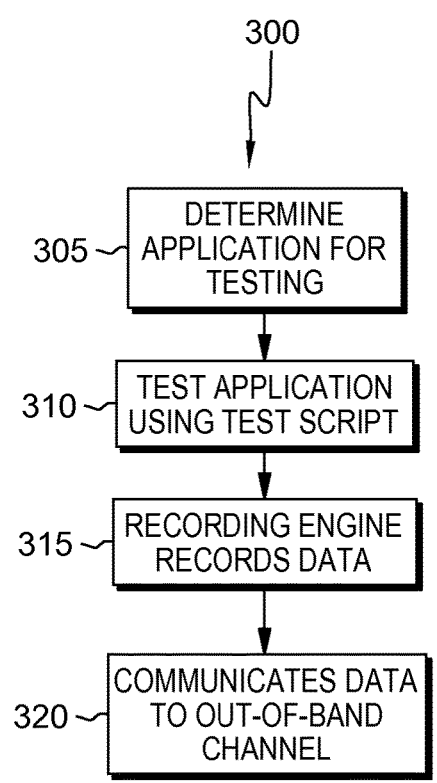
FIG. 2
FIG. 3

APPLICATION TEST AUTOMATION TRANSMITTING DATA VIA PHONE/VOICE CALLS

BACKGROUND OF THE INVENTION

The present invention relates generally to the field of application testing, and more particularly to automation of application testing using out-of-band channels.

With the increase of applications (often referred to as "apps") on computing devices, there has been an increase in testing and authenticating such applications. Testing can involve authentication via out-of-band data correlation (wherein "data correlation" makes use of data returned in response to a previous step). "Out-of-band" refers to communication, which occurs outside of a previous established communication method or channel, and related authentication that involves using two separate networks or channels simultaneously in communication to identify a user. One such network or channel will typically be something other than a primary network or channel.

Generally, many applications include features, which trigger an action outside the application itself. In a banking application, a one-time password (OTP) can be sent as a text message (e.g., a SMS [short messaging service] text message) or audio message (e.g., voice call) and involves user input or intervention to type the password into an appropriate field. Location-based applications, on the other hand, involve user input or intervention to enter information such as a zip code in order to present relevant results. Shopping applications can often involve the sending of promotion codes via email or SMS, and can be used during a checkout process.

SUMMARY

Embodiments of the present invention include a method, computer program product, and system for testing a mobile application. In one embodiment, an application for testing is determined. A test script associated with the application for testing is determined. The application is tested using the test script. The testing requires transferring data form the application to an out-of-band channel.

BRIEF DESCRIPTION OF THE DRAWINGS

FIG. 2 is a flowchart depicting operational steps for setting up a test script of an application under test, in accordance with an embodiment of the present invention;

FIG. 3 is a flowchart depicting operational steps for running a test script of an application under test, in accordance with an embodiment of the present invention.

DETAILED DESCRIPTION

Generally, in conventional arrangements, testing of applications, which use out-of-band processes, require significant user intervention. For instance, a banking application may produce a one-time password (OTP) and the user must communicate the OTP to an out-of-band channel. In another instance, a social media application may produce an OTP and the user must communicate the OTP to an out-of-band channel.

By way of an illustrative example, for a mobile phone application of a bank, the user may first enter his/her standard password for the application, and then request the application generate an OTP. Here, the user may hit a button (on the mobile phone touchscreen), "Generate OTP", and the OTP may appear on the screen along with an acknowledgement. The acknowledgement may instruct the user to call a specific number and input the OTP to verify the account of the mobile phone application of a bank. Upon verification, the user may then proceed to one or more screens associated with the mobile phone application, and even then may need to re-enter his/her standard password to perform a sensitive action such as making an account balance inquiry.

Generally, conventional test automation tools for application are configured for, or bound to, merely a single application (AUT). Thus, any action, which occurs outside of the scope of the application, cannot be captured during testing, and a playback service will be unable to play that action back with the flow of the test script. Possible solutions involve manual entry of values during automation run, using data pools with pre-defined values and/or using application stubs and these solutions involve significant disadvantages. Accordingly, there are broadly contemplate herein, in accordance with at least one embodiment of the invention, methods and arrangements for providing an application test automation system which facilitates correct of out-of-band process data, effective test script creation, and fully automated playback.

Embodiments of the present invention determine data from an application under test (AUT) and communicate the data to an out-of-band channel. Embodiments of the present invention create a test script to automatically determine data from an AUT. Embodiments of the present invention create a test script to automatically communicate data to an out-of-band channel.

Figure 1:
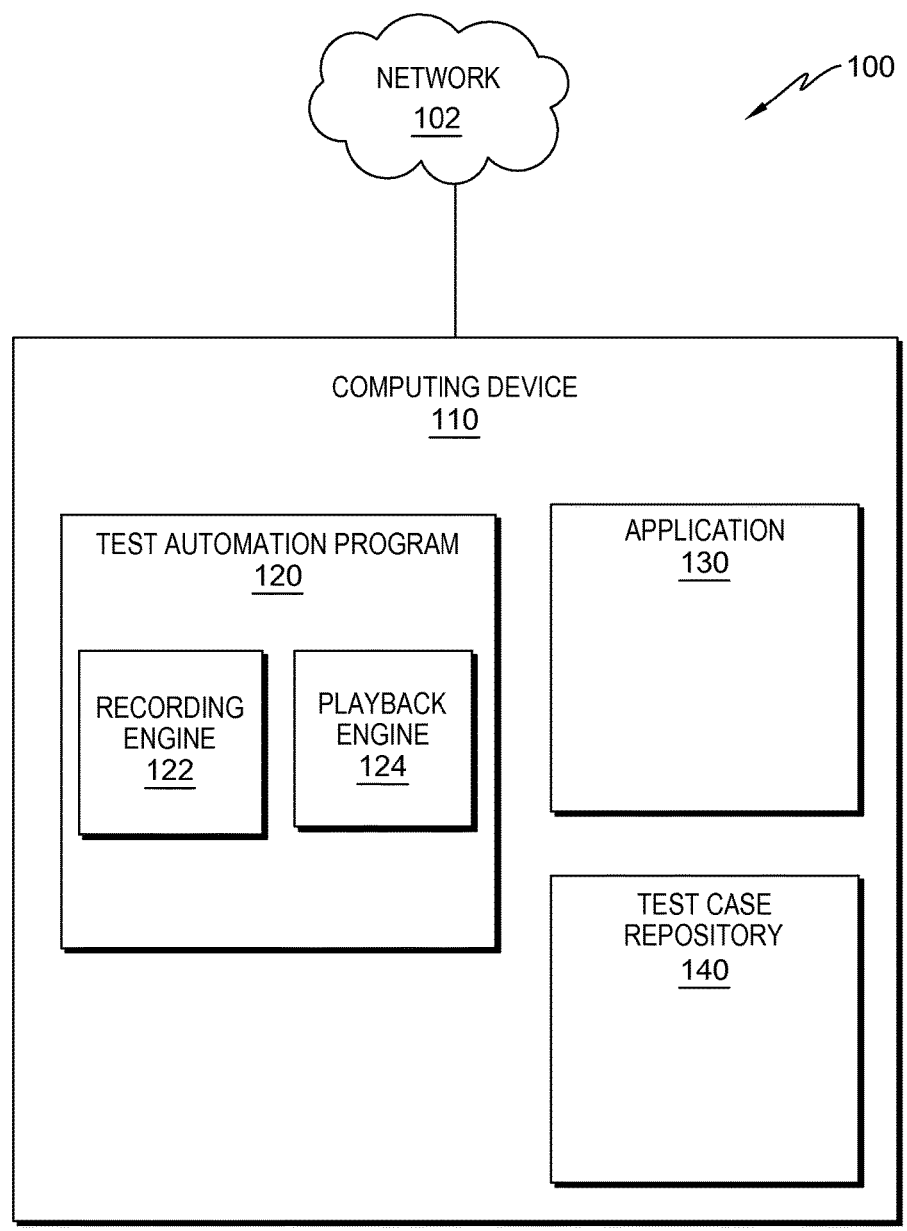
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of data processing environment 100 includes computing device 110, connected to network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computing device 110 and any other computer connected to network 102, in accordance with embodiments of the present invention.

In example embodiments, computing device 110 can be a laptop, tablet, or netbook personal computer (PC), a desktop computer, a personal digital assistant (PDA), a smart phone, or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment. In general, computing device 110 is representative of any electronic device or combination of electronic devices capable of executing computer readable program instructions. Computing device 110 can include components as depicted and described in further detail with respect to FIG. 4, in accordance with embodiments of the present invention.

Computing device 110 includes test automation program 120, application 130 and test case repository 140. Test automation program 120 is a program, application, or subprogram of a larger program for setting up and/or running a test script of an application under test (e.g., application 130). Application 130 is the application under test (AUT). An application may be under test during the development of the application or to test an issue in the application. Test case repository 140 may include a test script for each application under test and test scripts that are created for an application under test are stored in test case repository 140.

In an alternative embodiment, test automation program 120 may be found on one or more devices (not shown) interconnected to computing device 110 via network 102. In yet another embodiment, test automation program 120 may be on computing device 110 and any other number of other devices interconnected to computing device 110 via network 102.

In an embodiment, test automation program 120 includes recording engine 122 and playback engine 124. In an embodiment, recording engine 122 records actions that take place in the application. In an embodiment, recording engine 122 can record actions that are textual based (i.e., OTP as text in the application), audio based (i.e., application 130 indicates the OTP in audio form), or any other form of media. In an embodiment, playback engine 124 plays back actions that are recorded. In an embodiment, playback engine 124 may play back the actions in the original form of media recorded by recording engine 122. In an alternative embodiment, playback engine 124 may play back the actions in a different form of media from the form of media recorded by recording engine 122.

In an embodiment, test automation program 120 determines an application (i.e., application 130) for testing. Test automation program 120 determines a test script from test case repository 140 that is associated with application 130. Recording engine 122 records data from application 130. Test automation program 120 compares and correlates the data received by recording engine 122 and data input by a user.

In an alternative embodiment, test automation program 120 determines an application (i.e., application 130) for testing. Test automation program 120 tests application 130 using the test script. Recording engine 122 records data from application 130. Test automation program 120 communicates data to an out-of-band channel using playback engine 124.

A user interface (not shown) is a program that provides an interface between a user and test automation program 120. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes application 130. In an embodiment, application 130 is the application under test (AUT). In an embodiment, application 130 may be any type of application that can be used on computing device 110. In an embodiment, application 130 may be a banking application, social media application, location-based application, or a shopping application. In an embodiment, application 130 may be any application that may be tested. In an embodiment, application 130 may be any application that may use a one-time password (OTP). In an alternative embodiment, application 130 may be found on one or more devices (not shown) interconnected to computing device 110 via network 102. In yet another embodiment, application 130 may be on computing device 110 and any other number of other devices interconnected to computing device 110 via network 102.

In an embodiment, computing device 110 includes test case repository 140. In an embodiment, test case repository 140 may be found on computing device 110. In an alternative embodiment, test case repository 140 may be found on one or more device (not shown) interconnected to computing device 110 via network 102. In yet another embodiment, test case repository 140 may be on computing device 110 and any other number of devices interconnected to computing device 110 via network 102. In an embodiment, test case repository 140 may include a test script for each application under test and test scripts that are created for an application under test are stored in test case repository 140. A test script may be an output of recording user actions performed on an application in a structured format (e.g., combination of action and its meta data).

Test case repository 140 may be implemented using any volatile or non-volatile storage media for storing information, as known in the art. For example, test case repository 140 may be implemented with a tape library, optical library, one or more independent hard disk drives, or multiple hard disk drives in a redundant array of independent disks (RAID). Similarly, test case repository 140 may be implemented with any suitable storage architecture known in the art, such as a relational database, an object-oriented database, or one or more tables.

FIG. 2 is a flowchart of workflow 200 depicting operational steps for setting up a test script of an application under test, in accordance with an embodiment of the present invention. In one embodiment, the steps of the workflow are performed by test automation program 120. Alternatively, steps of the workflow can be performed by any other program while working with test automation program 120. In an embodiment, test automation program 120 can invoke workflow 200 upon receiving an indication to test an application.

Test automation program 120 determines an application for testing (step 205). In an embodiment, test automation program 120 receives an indication from a user, via the user interface discussed previously, of an application to be tested. In an alternative embodiment, test automation program 120 receives an indication from another program of an application to be tested. In an embodiment, the application may be application 130. For example, test automation program 120 receives an indication from the user to test a banking application.

Test automation program 120 determines a test script to setup (step 210). In other words, test automation program 120 determines a test script to be setup that is associated with application 130. In an embodiment, test automation program 120 may create a new test script for application 130 that does not have a previously created test script. In an alternative embodiment, test automation program 120 may determine an already created test script for application 130 and modify the already created test script. In yet another alternative embodiment, test automation program 120 may determine a test script template used for a specific type of applications that are the same as application 130. In an embodiment, the test script is stored in test case repository 140. For example, test automation program 120 determines banking application test script associated with banking application. Banking application test script is stored in test case repository 140.

Test automation program 120 uses recording engine 122 to record data (step 215). In other words, the determined test script is initiated and the test script progresses to an instance where the AUT (i.e., application 130) needs to use an OTP for out-of-band channel verification. The recording engine 122 included in test automation program 120 interacts with application 130 to record data from application 130 regarding the OTP. The data may be textual based (i.e., OTP as text in application 130), audio based (i.e., application 130 indicates the OTP in audio form), or any other form of media. In an embodiment, the data recorded by recording engine 122 may be stored in test case repository 140. For example, test automation program 120 initiates the test script associated with the banking application, the banking application produces a OTP of "xy347tlr" as a textual representation on the user interface, and recording engine 122 records the OTP and stores the information in test case repository 140.

Test automation program 120 compares and correlates user input to recorded data (step 220). In other words, test automation program 120 determines the user input of the OTP to the out-of-band channel and compares the user input data to the data previously recorded by recording engine to determine the accuracy of the test script. Test automation program 120 determines the user input data for the OTP made to the out-of-band channel. The user input data may be textual based (i.e., user input of OTP as text to out-of-band channel), audio based (i.e., user input of OTP in audio form to out-of-band channel), or any other form of media. In an embodiment, the textual based out-of-band channel may be in the form of an SMS or e-mail. In an embodiment, the audio based out-of-band channel may be a phone call or any form of voice communication. In an embodiment, the user input data and recording engine 122 data may be in the same form of media. In an alternative embodiment, the user input data and recording engine 122 data may be different forms of media.

Test automation program 120 compares the user input data to the data recorded by recording engine 122 previously. If test automation program 120 determines the two sets of data are the same then the test script is setup correctly. In other words, the test automation program 120, when using the test script, records the correct data from application 130 for the OTP. If test automation program 120 determines the two sets of data are different then the test scrip is setup incorrectly and any step of workflow 300 may be performed to correct the test script. In other words, the test automation program 120, when using the test script, records incorrect data from application 130 for the OTP because the recorded data does not match the user input data. For example, test automation program 120 determines the user input data to the out-of-band channel is "xy347tlr" by determining the audio communication by the user to the out-of-band channel was the sequence of "xy347tlr" in that alphanumeric order. Test automation program 120 compares the user input of "xy347tlr" to the recorded data of "xy347tlr". Test automation program 120 determines the two sets of data are the same and therefore the test script for the banking application is setup correctly because recording engine 122 is recording the correct OTP from the banking application.

In an embodiment, the test script uses recording engine 122 to discover the view object ID/position which contains the data that includes the OTP. In an embodiment, during step 215, test automation program 120, using recording engine 122, captures all the view objects and the text in the activity screen of application 130 just before the communication to the out-of-band channel (i.e., the phone call). In an embodiment, test automation program 120, using recording engine 122, intercepts the operating system event-bus to capture all of the keystroke actions made for application 130 during the communication to the out-of-band channel (i.e., the phone call). In an embodiment, test automation program 120 correlates the key stroke actions for application 130 and compares them to the OTP entered through keystrokes during communication to the out-of-band channel (i.e., the phone call). In an embodiment, based on the correlation and accuracy of the key strokes, test automation program 120 identifies the object ID/position the OTP will be located.

FIG. 3 is a flowchart of workflow 300 depicting operational steps for running a test script of an application under test, in accordance with an embodiment of the present invention. In one embodiment, the steps of the workflow are performed by test automation program 120. Alternatively, steps of the workflow can be performed by any other program while working with test automation program 120. In an embodiment, test automation program 120 can invoke workflow 200 upon receiving an indication to test an application.

Test automation program 120 determines an application for testing (step 305). In an embodiment, test automation program 120 receives an indication from a user, via the user interface discussed previously, of an application to be tested. In an alternative embodiment, test automation program 120 receives an indication from another program of an application to be tested. In an embodiment, the application may be application 130. For example, test automation program 120 receives an indication from the user to test a banking application.

Test automation program 120 will test application using a test script (step 310). In other words, test automation program 120 determines the test script in test case repository 140 that is associated with application 130. In an embodiment, the test script has been previously created or setup using workflow 200. Test automation program 120 then initiates the test script to test application 130. For example, test automation program 120 determines the test script in test case repository 140 that is associated with the banking application and test automation program 120 initiates the test script.

Test automation program 120 uses recording engine 122 to record data (step 315). In other words, the determined test script is initiated and the test script progresses to an instance where the AUT (i.e., application 130) needs to communicate an OTP from application 130 to an out-of-band channel for verification. The recording engine 122 included in test automation program 120 interacts with application 130 to record data from application 130 regarding the OTP. In an embodiment, the test script uses recording engine 122 to discover the view object ID/position which contains the data that includes the OTP and then recording engine 122 records the data found in the view object ID/position. The data may be textual based (i.e., OTP as text in application 130), audio based (i.e., application 130 indicates the OTP in audio form), or any other form of media. In an embodiment, the information recorded by recording engine 122 may be stored in test case repository 140. For example, test automation program 120 initiates the test script associated with the banking application, the banking application produces a OTP of "xy347tlr" as a textual representation on the user interface, and recording engine 122 records the OTP and stores the information in test case repository 140.

Test automation program 120 uses playback engine 124 to communicate the data to the out-of-band channel (step 320). In other words, the playback engine 124 will communicate the data previously recorded by recording engine 122 to the out-of-band channel for verification. The playback engine 124 included in test automation program 120 interacts with the out-of-band channel to communicate the recorded data to the out-of-band channel. In an embodiment, the test script uses playback engine 124 to playback the data that was recorded by recording engine 122 in the determined the view object ID/position which contains the data that includes the OTP. The playback engine 124 data may be textual based (i.e., playback engine 124 communication of OTP as text to out-of-band channel), audio based (i.e., playback engine 124 communication of OTP in audio form to out-of-band channel), or any other form of media. In an embodiment, the data communicated by playback engine 124 may be stored in test case repository 140. For example, test automation program 120, in the process of the test script for the banking application, must communicate an OTP to an out-of-band channel. Playback engine 124 retrieves the data (i.e., the OTP) from test case repository 140 and playback engine 124 communicates the data to the out-of-band channel. Upon receiving the out-of-band channel receiving the OTP and verifying the OTP, application 130 is verified and the test script can continue.

In an embodiment, the test script uses playback engine 124 to playback the data that was recorded by recording engine 122 in the determined view object ID/position which contains the data that includes the OPT. After discovering the OTP, playback engine 124 playbacks the same technique (recorded in the record phase) used to send data to the out-of-band channel. The recorded view object ID/position and the recorded data-transfer technique get used in the playback phase. For example, if the out-of-band channel is a phone call, when the phone call is received, keystrokes for the corresponding OTP is injected in to the OS Event Bus to transfer to the phone call. In an embodiment, the time in which the keystroke events should be injected is determined either by time comparison observed during the record phase (without any phone call parsing) or basic keyword spotting in the phone call.

Figure 4:
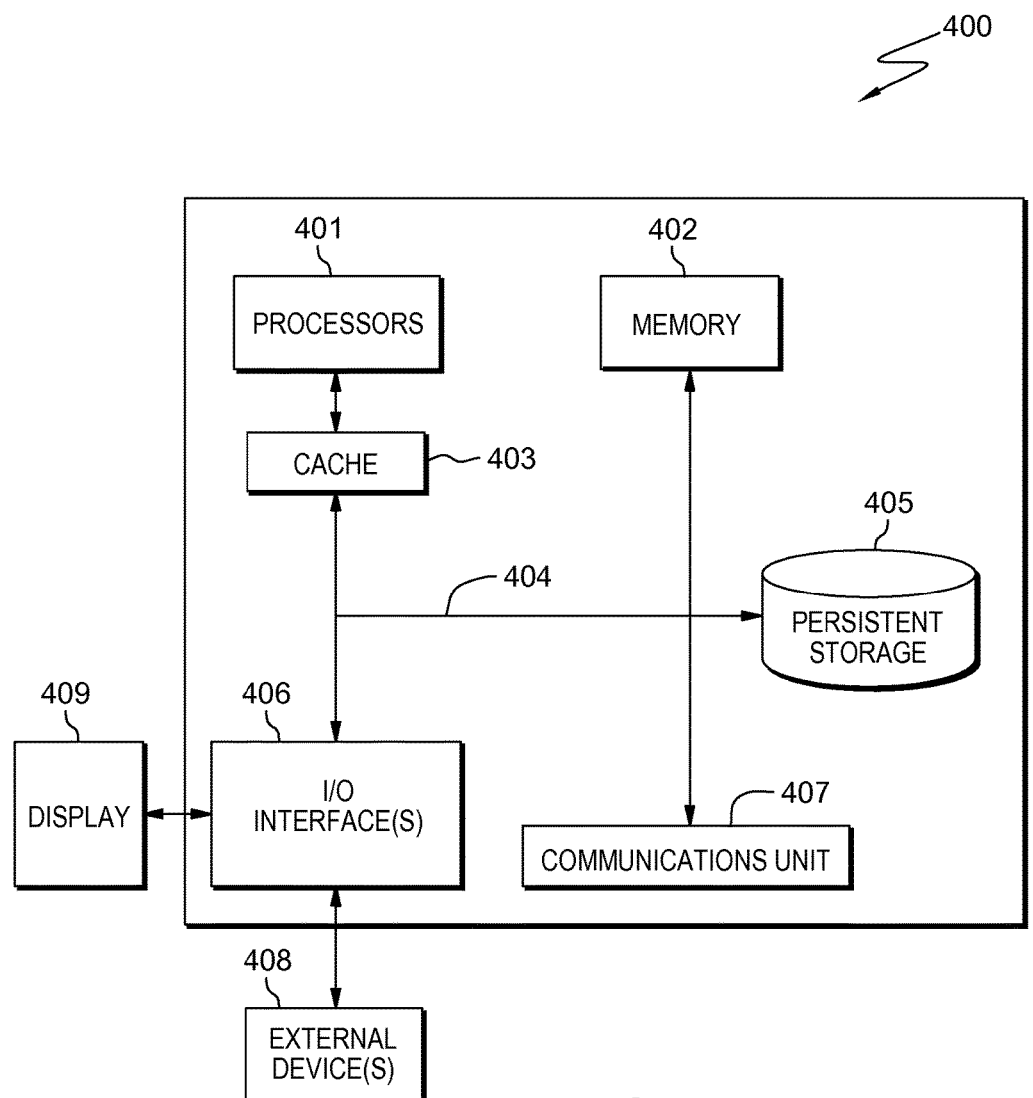
FIG. 4 depicts a block diagram of components of the computer of FIG. 1, in accordance with an embodiment of the present invention.

FIG. 4 depicts computer 400 that is an example of a computing system that includes test automation program 120. Computer 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for testing a mobile application, the method comprising the steps of:
   receiving, by one or more computer processors, an indication, wherein the indication includes an application for testing;
   determining, by one or more computer processors, a test script associated with the application for testing;
   determining, by one or more computer processors, a view object ID/position in the application for testing based, at least in part, on the test script;
   recording, by one or more computer processors, a data found in the view object ID/position in the application for testing; and
   testing, by one or more processors, the application using the test script, wherein the testing requires transferring the recorded data to an out-of-band channel.

2. The method of claim 1, wherein the out-of-band channel is an audio communication.

3. The method of claim 1, wherein the out-of-band channel is a phone call.

4. The method of claim 1, wherein the out-of-band channel is a textual communication.

5. The method of claim 1, wherein the data is a one-time password.

6. The method of claim 1, wherein the data found in the view object ID/position is recorded in a first media type and transferred in a second media type.

7. A computer program product for testing a mobile application, the computer program product comprising:
   one or more computer readable storage media; and
   program instructions stored on the one or more computer readable storage media, the program instructions comprising:
      program instructions to receive an indication, wherein the indication includes an application for testing;
      program instructions to determine a test script associated with the application for testing;
      program instructions to determine a view object ID/position in the application for testing based, at least in part, on the test script;
      program instructions to record a data found in the view object ID/position in the application for testing; and
      program instructions to test the application using the test script, wherein the testing requires transferring the data to an out-of-band channel.

8. The computer program product of claim 7, wherein the out-of-band channel is an audio communication.

9. The computer program product of claim 7, wherein the out-of-band channel is a phone call.

10. The computer program product of claim 7, wherein the out-of-band channel is a textual communication.

11. The computer program product of claim 7, wherein the data is a one-time password.

12. The computer program product of claim 7, wherein the data found in the view object ID/position is recorded in a first media type and transferred in a second media type.

13. A computer system for testing a mobile application, the computer system comprising:
   one or more computer processors;
   one or more computer readable storage media; and
   program instructions, stored on the one or more computer readable storage media for execution by at least one of the one or more computer processors, the program instructions comprising:
      program instructions to receive an indication, wherein the indication includes an application for testing;
      program instructions to determine a test script associated with the application for testing;
      program instructions to determine a view object ID/position in the application for testing based, at least in part, on the test script;
      program instructions to record a data found in the view object ID/position in the application for testing; and
      program instructions to test the application using the test script, wherein the testing requires transferring the data to an out-of-band channel.

14. The computer system of claim 13, wherein the out-of-band channel is an audio communication.

15. The computer system of claim 13, wherein the out-of-band channel is a phone call.

16. The computer system of claim 13, wherein the out-of-band channel is a textual communication.

17. The computer system of claim 13, wherein the data is a one-time password.

18. The computer system of claim 13, wherein the data found in the view object ID/position is recorded in a first media type and transferred in a second media type.

* * * * *